(12) United States Patent
Bahlmann et al.

(10) Patent No.: US 6,899,776 B2
(45) Date of Patent: May 31, 2005

(54) WATER BLOCKING CABLE TAPE AND METHODS FOR MAKING SAME

(75) Inventors: Craig A. Bahlmann, Hickory, NC (US); Ethan E. Franklin, Morganton, NC (US)

(73) Assignee: Neptco Incorporated, Pawtucket, RI (US)

( * ) Notice: Subject to any disclaimer, the term of this patent is extended or adjusted under 35 U.S.C. 154(b) by 126 days.

(21) Appl. No.: 10/440,207

(22) Filed: May 16, 2003

(65) Prior Publication Data

US 2004/0229536 A1 Nov. 18, 2004

(51) Int. Cl.⁷ .............................................. B32B 31/18
(52) U.S. Cl. .................... 156/73.3; 156/73.1; 156/259; 156/277; 156/290; 156/308.4
(58) Field of Search ............................... 156/73.1, 73.3, 156/250, 259, 277, 290, 308.2, 308.4, 580.1, 580.2; 264/442, 443, 444

(56) References Cited

U.S. PATENT DOCUMENTS

| | | | | |
|---|---|---|---|---|
| 4,478,661 A | * | 10/1984 | Lewis | 156/92 |
| 5,163,115 A | | 11/1992 | Sheu | 385/100 |
| 5,188,883 A | * | 2/1993 | Rawlyk | 428/189 |
| 5,642,452 A | | 6/1997 | Gravely et al. | 385/113 |
| 6,173,100 B1 | | 1/2001 | Newton et al. | 385/102 |
| 6,284,367 B1 | * | 9/2001 | Gruhn et al. | 428/355 AC |
| 6,348,236 B1 | * | 2/2002 | Fairgrieve et al. | 427/372.2 |

FOREIGN PATENT DOCUMENTS

| | | | | |
|---|---|---|---|---|
| EP | 0 314 991 B1 | 10/1988 | | G02B/6/44 |
| EP | 0 827 625 B1 | 8/2000 | | H01B/7/28 |

* cited by examiner

Primary Examiner—James Sells
(74) Attorney, Agent, or Firm—Mintz, Levin, Cohn, Ferris, Glovsky and Popeo, P.C.

(57) ABSTRACT

The invention provides a water blocking tape for use in a variety of cable designs, such as power cable, data communications cable and telecommunications cable. A water blocking tape according to the invention includes layers of lightweight nonwoven fabric with one or more swellable water blocking compounds, such as water absorbent polymers, disposed between the layers. The nonwoven fabric layers are bonded in a pattern using an ultrasonic bonding technique. The bonding pattern helps to contain and to restrain movement of the water blocking compounds between the layers. The bonding pattern compartmentalizes the water blocking compounds to prevent pooling of the compounds and to facilitate a substantially consistent distribution of the compounds between the layers such that when a tape contacts water, the tape achieves a substantially consistent swell height. A substantially consistent swell height permits a tape to serve as a reliable water barrier to prevent damage and degradation of a cable and its components. Ultrasonic bonding of the multilayer tape eliminates the need and use of adhesives and bonding agents to form the tape that can have inhibiting effects on a swelling action of the tape.

9 Claims, 7 Drawing Sheets

WATER BLOCKING CABLE TAPE AND METHODS FOR MAKING SAME

FIELD OF THE INVENTION

The invention is directed generally to a nonwoven water blocking tape for use with power, data communications and telecommunications cables.

BACKGROUND OF THE INVENTION

Underground cable systems including power (energy) cables or data communications and telecommunications cables are invariably susceptible to damage and degradation caused by infiltration and migration of water into cable cores. Water is particularly hazardous to fiber optic cable, causing long-term reduction in transmission reliability and outright transmission failure.

Fiber optic cables are susceptible to water damage due to, for instance, mechanical damage to an outer cable jacket or a sheathing system that allows water to penetrate into a central core or buffer tubes containing optical fibers. Exposure of optical fibers to water causes microbending wherein water near or surrounding the optical fibers freezes and stresses the structure of the optical fibers, causing optical fibers to bend. Microbending degrades optical fibers and increases losses of signal transmission. Changes in ambient conditions also expose optical fibers to moisture. Such changes create different vapor pressures inside and outside a cable jacket that cause moisture to diffuse through the jacket into a central core or group of buffer tubes, exposing the optical fibers to undesirable moisture.

Many cable products are provided with one or more forms of water blocking 25 protections to prevent ingress and migration of water. Prior art water blocking protections are incorporated with cables in various forms including waterproof jackets, water blocking layers incorporated between a central core and a core or jacket, water blocking yarns, water blocking tapes, and combinations thereof. Such water blocking protections impart water blocking capabilities to underground cable to prevent water penetration through cable sheathing systems toward central core areas, e.g., containing optical fibers, and to prevent further damage caused by water migration along cable axes. Prior art water blocking tapes are often disposed between a central core and a sheathing system or outer cable jacket. For instance, U.S. Pat. No. 6,173,100 discloses a water blocking tape disposed between a core and an outer jacket. The tape includes two or more layers of material with fibers. The fibers form a matrix for bonding with and retaining superabsorbent polymers applied to the layers. U.S. Pat. No. 5,642,452 discloses a fiber optic cable including a water blocking system comprising a protective layer with water swellable characteristics disposed between a core and a jacket. The cable also includes one or more water blocking yarns with swellable characteristics that extend longitudinally along the cable. The blocking yarns and the protective layer are treated with a superabsorbent compound, such as polyacrylic acid, to impart swelling characteristics to the yarns and the protective layer before incorporation with the cable.

Other prior art water blocking protections include strength members treated with water absorbing compounds. U.S. Pat. No. 5,163,115 discloses a water blocking member treated with a saline-tolerant, temperature-resistive superabsorbent polymer. European Publication No. 0 314 991 Bi discloses a substrate member disposed between an inner central core containing optical fibers and a plastic cable jacket that is impregnated with a film or a paste of a water swelling or superabsorbent material, such as polyacrylic acid or polyacrylamide. European Publication No. 0 827 625 Bi discloses a water blocking composite impregnated with or having a coating of a mixture of a radiation polymerized 20 compound and a water swellable compound.

Layered water blocking tapes are, however, susceptible to "fall-out" or loss of water blocking compounds contained between layers of material during cable manufacture. For certain applications, water blocking tapes and materials must be sufficiently thin and flexible for use, for instance, with certain cable designs, such as fiber 25 optic cable. Such tape configurations can limit the amount of water absorbent compounds that may be loaded between layers of material. Multilayer water blocking tapes are often sealed or bonded with adhesives and bonding agents, and, in some cases, are necessary for containment of water blocking compounds. Such adhesives and bonding agents can inhibit the swelling action of water blocking compounds when contacted by water and can limit the extent to which water blocking tapes may swell and increase in thickness, compromising the tapes water protection properties.

Thus, a water blocking tape is desirable that can overcome at least some limitations of multilayer tapes. In addition, a water blocking tape configured to contain one or more water absorbent compounds sufficient to provide a required swell height is desirable. A water blocking tape is also desirable that provides a substantially consistent distribution of one or more water absorbent compounds between layers to ensure consistent swell height. Forming a water blocking tape without use of adhesives and/or bonding agents is also desirable to help to maximize the tape's swelling action and swell height. A water blocking tape that is lightweight and has sufficient flexibility for use with certain cable designs, such as fiber optic cable, is desirable.

SUMMARY OF THE INVENTION

In general, in an aspect, the invention provides an improved water blocking tape for use with cable. In another aspect, the invention provides a multilayer water blocking tape having two or more layers of material bonded in a pattern. The pattern helps to prevent migration or to restrain movement of one or more water absorbent compounds disposed between layers. A further aspect of the invention provides an improved system and method of forming a water blocking tape using ultrasonic bonding and ultrasonic cutting techniques that eliminate use of adhesives and bonding agents.

In one aspect, the invention provides a water blocking tape comprising a first layer of material; one or more water blocking compounds disposed on a surface of the first layer of material; and a second layer of material disposed on the one or more water blocking compounds such that the water blocking compounds are disposed between the first layer and the second layer of material, wherein the first layer and the second layer are bonded ultrasonically to one another along a pattern traversing a surface of at least a portion of the first layer and the second layer to contain and to restrain movement of the one or more water blocking compounds between the first layer and the second layer.

Implementations of the invention may include one or more of the following features. The one or more water blocking compounds are compartmentalized by the pattern such that the one or more water blocking compounds are disposed substantially consistently between the first layer and the second layer. When the tape contacts water, the tape swells to a substantially consistent swell height.

Implementations of the invention may also include one or more of the following. The pattern includes a repeating and substantially uniform pattern. The repeating and substantially uniform pattern includes a pattern of similar diamond shapes, each diamond shape being sized at about 1.6 cm by 1.6 cm. The first layer of material includes a nonwoven material. The second layer of material includes a nonwoven material. The first layer of material has substantially similar dimensions as the second layer of material. The nonwoven material is selected from the group consisting of a spun bonded nonwoven fabric, a spun bonded melt blown spun bonded nonwoven fabric, a spun bonded melt blown melt blown spun bonded nonwoven fabric, a melt blown nonwoven, a nonwoven nylon, a carded nonwoven fabric, a plastic, a polyester, polyethylene terephthalate, and combinations thereof. The nonwoven material has a weight from about 10 grams per square meter (gsm) to about 40 gsm.

The one or more water blocking compounds includes one or more swellable water absorbent compounds. The one or more water blocking compounds is selected from the group consisting of polyacrylate, polyacrylamide, polyvinyl alcohol, copolymer of polyacrylate, polyacrylamide, polyvinyl alcohol, copolymer of polyacrylate and polyacrylamide, copolymer of polyacrylate and polyvinyl alcohol, copolymer of polyacrylamide and polyvinyl alcohol, and combinations thereof. The one or more water blocking compounds are disposed at a loading weight of from about 10 gsm to about 50 gsm.

The tape further comprises at least one layer of a shielding material disposed directly on a surface of one of the first layer and the second layer and ultrasonically bonded thereto along the pattern.

In another aspect, the invention provides a method of forming a water blocking tape comprising providing a first sheet of material; dispensing one or more water blocking compounds on a surface of the first sheet of material; disposing a second sheet of material on the surface of the first sheet of material such that the one or more water blocking compounds are disposed between the first sheet and the second sheet to form a web; impinging at least a portion of a first surface of the web with ultrasonic waves; and printing a pattern on at least a portion of a second surface of the web, wherein the first sheet and the second sheet of material are bonded therethrough along the pattern.

Implementations of the method according to the invention may include one or more of the following features. Impinging at least a portion of the first surface of the web with ultrasonic waves includes impinging at least a portion of the first surface of the web with ultrasonic waves at substantially a same time as printing the pattern on at least a portion of the second opposite surface of the web. The portion of the first surface of the web impinged by ultrasonic waves is opposite to the portion of the second surface of the web printed with the pattern. The pattern traverses at least a portion of a width of the web. The pattern includes a repeating and substantially uniform pattern. Portions of the one or more water blocking compounds are compartmentalized by the pattern such that the one or more water block compounds are disposed substantially consistently between the first sheet of material and the second sheet of material.

Impinging the first surface of the ultrasonically bonded web with ultrasonic waves and contacting the second surface of the web with one or more cutting devices such that the cutting devices slit the web therethrough into one or more strips. Impinging the first surface of the ultrasonically bonded web with ultrasonic waves includes impinging the first surface of the ultrasonically bonded web at substantially a same time as the one or more cutting devices contacts the second surface of the web. A portion of the first surface of the web impinged by ultrasonic waves is opposite to an area of the second surface of the web contacted by the one or more cutting devices.

In a further aspect, the invention provides a system for forming a water blocking tape comprising a first conveying mechanism to supply a first layer of material, the first conveying mechanism disposed and configured to convey the first layer of material along an axis; a dispensing device disposed along the axis and configured to dispense one or more water blocking compounds on a first surface of the first layer of material as the first layer of material is conveyed past the dispensing device; a second conveying mechanism disposed along the axis downstream from the dispensing device to supply a second layer of material, the second conveying mechanism being disposed and configured to convey the second layer of material along the axis such that the second layer of material becomes disposed on the one or more water blocking compounds, wherein the first layer and the second layer of material form a web with the one or more water blocking compounds disposed therebetween; and an ultrasonic lamination device disposed along the axis downstream from the second conveying mechanism, the ultrasonic lamination device being disposed and configured to emit ultrasonic waves that impinge a first surface of the web and to print a pattern on a second surface of the web as the web is conveyed past the ultrasonic lamination device to bond the first layer of material to the second layer of material along the pattern.

Implementations of the system according to the invention may include one or more of the following features. The ultrasonic lamination device includes a first ultrasonic horn configured to emit ultrasonic waves and a printing device configured to print the pattern. The first ultrasonic horn and the printing device are disposed on opposite sides of the axis and are aligned to one another such that the web is conveyed between the first ultrasonic horn and the printing device. The first ultrasonic horn is configured to impinge the first surface of the web at substantially the same time as the printing device prints the pattern on the second surface of the web. The printing device is a roller having the pattern defined in its surface.

Implementations of the system according to the invention may also include one or more of the following features. The system further comprises an ultrasonic cutting device disposed along the axis downstream from the ultrasonic lamination device, the ultrasonic cutting device being disposed and configured to emit ultrasonic waves that impinge the first surface of the web and to slit the web therethrough from the second surface of the web to cut the web into multiple strips. The ultrasonic cutting device includes a second ultrasonic horn configured to emit ultrasonic waves and one or more cutting devices configured to slit the web. The second ultrasonic horn and the one or more cutting devices are disposed on opposite sides of the axis and are aligned to one another such that the web is conveyed between the second ultrasonic horn and the one or more cutting devices. The second ultrasonic horn is configured to impinge the first surface of the web at substantially the same time as the one or more cutting devices slit the second surface of the web and cut the web therethrough into multiple strips.

Implementations of the system according to the invention can further include a take-up device disposed along the axis downstream from the ultrasonic cutting device and being configured to wind the multiple strips of the web thereto.

Various aspects of the invention may provide one or more of the following advantages. A water blocking tape for use with different types of cable designs can be provided that includes one or more water blocking compounds for providing water absorption properties to a cable and for preventing water damage and degradation of a cable. A water blocking tape can be provided having a configuration for use with one or more cable components, e.g., a cable core, one or more protective layers surrounding a cable core, a sheathing system, a strength system having one or more strength members or rods or other protective components used in a cable. One or more of the water blocking compounds can include one or more water absorbent compounds, e.g., superabsorbent polymers.

Using ultrasonic bonding techniques, a multilayer water blocking tape can be formed without use of adhesives and bonding agents that, for instance, can inhibit or mask a swelling action of a water blocking compound disposed between layers of a tape when the compound contacts water. A lack of adhesives and bonding agents can help to maximize a potential swell volume of one or more water blocking compounds and can thereby help to maximize a potential swell height of a water blocking tape. Without use of adhesives and bonding agents to form a water blocking tape, a desired swell rate of water absorbent compounds can be achieved to provide a rapid response to penetration of water into a cable.

An ultrasonic bonding technique can be used to bond or fuse two or more layers of material, such as a nonwoven fabric, along a desired pattern such that water blocking compounds disposed between the layers are contained or compartmentalized by the pattern. The bonding pattern can define configurations and shapes to contain water blocking compounds and thereby to restrain movement and prevent migration and pooling of the water blocking compounds between the layers of material. Such a bonding pattern can help to facilitate a substantially consistent distribution of water blocking compounds between layers of a tape. A substantially consistent distribution of water blocking compounds throughout a tape can produce a substantially-consistent swell height of a tape when the tape contacts water. A substantially consistent swell height of a water blocking tape can help to form a reliable water barrier in a cable that helps to prevent water infiltration into a cable core and water migration along a span of a cable.

Ultrasonically bonding a multilayer water blocking tape in a pattern can also help to prevent or at least reduce "fall-out" of water blocking compounds disposed between layers during cable manufacture. Reducing "fall-out" can help to ensure a sufficient amount of water blocking compound contained between layers of a tape to provide adequate water absorption and water blocking ability of the tape.

Nonwoven fabrics can be used to construct a multilayer water blocking tape having sufficient strength to withstand cable manufacturing processes, while being lightweight such that the tape does not add weight to a cable. Nonwoven fabrics can provide a flexible multilayer water blocking tape particularly suited for use with, for instance, fiber optic cable. Nonwoven fabrics can include relatively inexpensive materials to form an economical multi layer tape. Other layers of different materials having specific properties, such as heat shielding properties, can be incorporated into a multi layer water blocking tape by ultrasonic bonding such layers.

Ultrasonic bonding and ultrasonic cutting techniques can be used in a system and method of producing multiple tapes from a multilayer web of nonwoven fabric having one or more water blocking compounds disposed between the layers. A continuous inline system and method using ultrasonic bonding and ultrasonic cutting techniques can form from a single production run one or more multilayer water blocking tapes from the web having desired dimensions for use in more than one application or cable design.

These and other advantages of the invention, along with the invention itself, will be more fully understood after a review of the following figures, detailed description, and claims.

BRIEF DESCRIPTION OF THE DRAWINGS

For a better understanding of the present invention, reference is made to the drawings, which are incorporated herein by reference and in which:

FIGS. 2a–2b are top views of the tape shown in FIG. 1a.

FIG. 3 is a top view of another aspect of the tape shown in FIG. 1a.

DETAILED DESCRIPTION OF THE INVENTION

The invention provides a water blocking tape for use with a cable, such as a data communications cable, a telecommunications cable, or a power cable. The water blocking tape according to the invention generally includes a first layer of nonwoven material disposed on a second layer of nonwoven material with one or more swellable water blocking compounds disposed between the first and the second layers. The layers are bonded in a pattern using ultrasonic bonding techniques. The layers are substantially simultaneously impinged with ultrasonic waves and printed with a pattern to bond or fuse the layers along the lines and demarcations of the pattern. The bonding pattern helps to contain or to compartmentalize the water blocking components between the layers. When the tape is applied to a cable or integrated with one or more cable components, the tape provides water blocking properties. Other embodiments are within the scope of the invention.

Figure 1A:
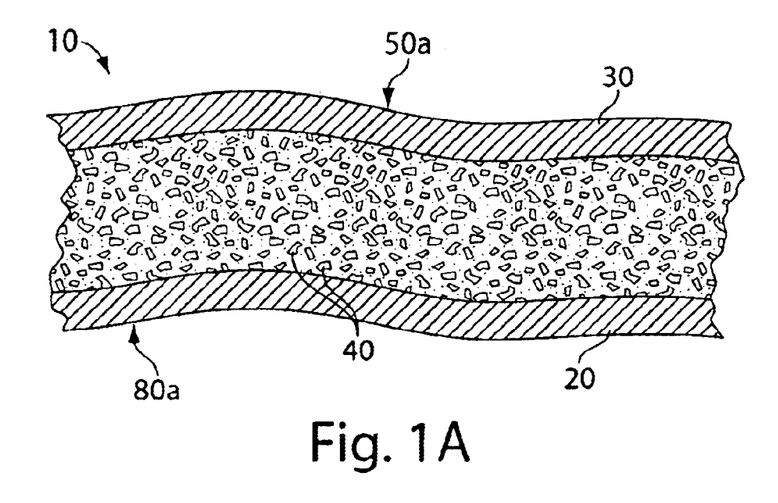
FIGS. 1a–1b are cross-sectional views of one aspect of a water blocking tape according to the invention.
Figure 1B:
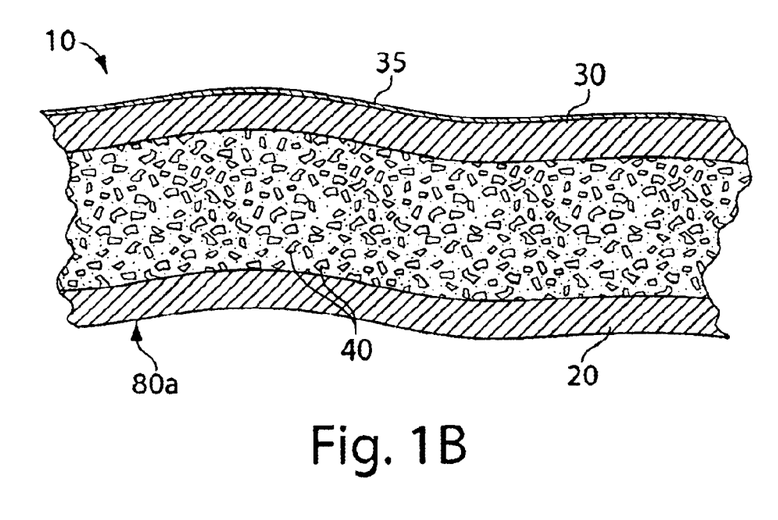

Referring to FIGS. 1a–1b, in a first embodiment, the invention provides a water blocking tape 10 including at least a first layer of material 20 disposed with at least a second layer of material 30, and at least one water blocking compound 40 contained between the first and the second layers 20 and 30. In one embodiment, a layer of shielding, e.g., heat shielding, material 35 can be disposed with at least one of the first layer 20 and the second layer 30 of nonwoven material, as shown in FIG. 1b. The invention, however, is not limited to the tape 10 shown in FIGS. 1a–1b, but anticipates other configurations including additional layers to achieve the multilayer tape 10.

In one embodiment, the first and the second layers 20 and 30 can be constructed of a nonwoven material suitable for providing strength to the tape 10 such that the tape 10 can withstand cable manufacturing processes. A suitable nonwoven material can include a lightweight material or fabric that will not add significant weight to a cable. A nonwoven material or fabric suitable for constructing the first and the second layers 20 and 30 can include, but is not limited to, a spun bonded nonwoven, e.g., spun bonded polyester, a spun bonded melt blown spun bonded (SMS) nonwoven, e.g., SMS polypropylene, a spun bonded melt blown melt blown spun bonded (SMMS) nonwoven, a melt blown nonwoven, a spun bonded nonwoven, e.g., spun bonded polyurethane, a nonwoven nylon, a carded nonwoven and combinations thereof. In different embodiments of the invention, these materials may be preferred because they are comparatively inexpensive and have flexibility to permit use of the tape 10 with fiber optic cable. Such materials as nonwoven polypropylene or nonwoven polyester are commercially available from BBA Nonwovens, Simpson, S.C., and Kimberly Clark, Neenah, Wash.

In another embodiment, the first and/or the second layers 20 and 30 can be constructed of a plastic or polyester layer or film, such as polyethylene terephthalate (PET).

In one embodiment, the first and the second layers 20 and 30, can be constructed, for example, of a spun bonded melt blown spun bonded (SMS) polypropylene nonwoven having a high tensile strength and low porosity. The first and the second SMS polypropylene nonwoven layers can have a weight of from about 10 grams per square meter (gsm) to about 40 gsm, and preferably about 16 gsm to produce an economical tape 10. Heavier SMS polypropylene nonwovens are comparatively more expensive than lighter polypropylene nonwovens.

Figure 2A:
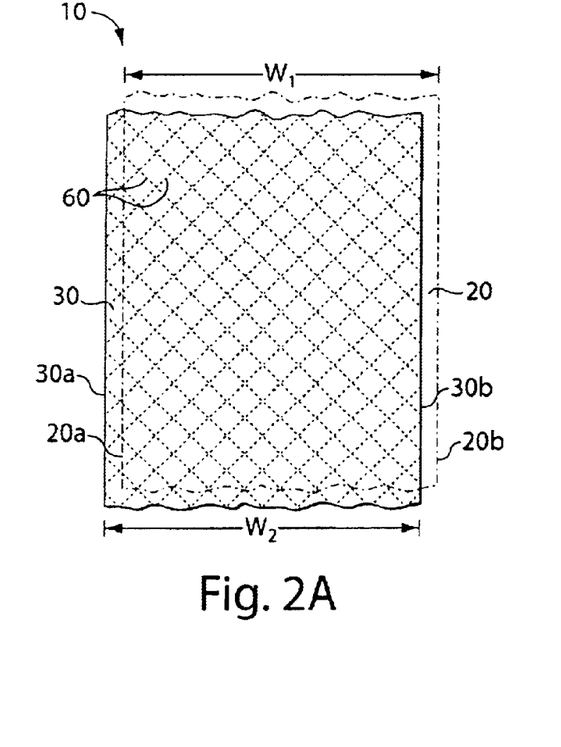
Figure 2B:
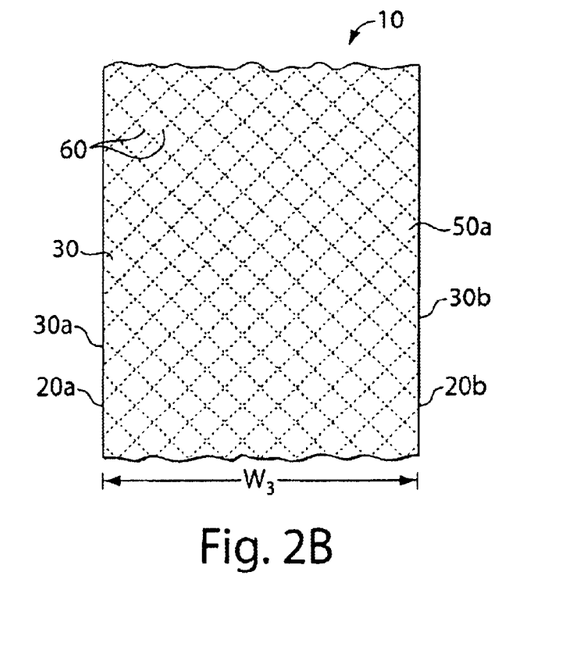

Referring to FIGS. 2a–2b, the first and the second layers of nonwoven material 20 and 30 each has a width $W_1$ and $W_2$ that can be sized depending on an application or a cable design in which the tape 10 is used. As shown in FIG. 2b, in one embodiment, the first layer and the second layers 20 and 30 have widths $W_1$ and $W_2$ that are substantially similar. The first layer 20 (not shown) has essentially similar dimensions, e.g., length and width, as the second layer 30. Longitudinal edges 20a and 20b of the first layer 20 are substantially even with longitudinal edges 30a and 30b of the second layer 30. The resulting tape 10 according to the invention is not limited in width $W_3$ and can be configured for use in a variety of different applications and cable designs. For instance, in one embodiment, the tape 10 can have a width $W_3$ of from about 10 mm to about 100 mm for use with or incorporating with one or more components of a fiber optic cable. In another embodiment, the tape 10 can include a relatively wide width $W_3$, e.g., about 200 mm, for use with a power cable.

The shielding layer 35 can be constructed of a material suitable for providing shielding properties, such as heat shielding, and/or other properties to one or more components of a cable in which the tape 10 is disposed or integrated with. A suitable material includes, but is not limited to, polyester and carbon-impregnated polyester.

As shown in FIGS. 1a–1b, the tape 10 includes the water blocking compounds 40 disposed between the first and the second layers 20 and 30. The compound 40 can include, but is not limited to, one or more swellable, superabsorbent polymers referred to in the art as "SAPs". SAPs include polymers having a capacity of absorbing water up to about one thousand times their weight in distilled water. Upon contact with water, the SAPs absorb and bond with water molecules, thereby swelling and increasing in volume. When the tape 10 is incorporated within a cable and/or with one or more of its components, the SAP 40 absorbs water upon contact and swells. The swollen tape 10 forms a physical barrier that helps to prevent or to at least reduce infiltration of water into the cable. The swelling action of the SAP 40 increases a thickness or height of the tape 10 to a "swell height" such that the tape 10 can serve as a water barrier. The tape 10 can also help to prevent or to at least reduce migration of water along a length or span of a cable.

SAPS are commercially available in a variety of forms, such as superabsorbent 20 powders, fine particles, fine fibers or components of water blocking coatings. In one embodiment, the SAP 40 is a superabsorbent polymer suitable for providing one or more of the water blocking qualities noted above and can include, but is not limited to, polyacrylate, polyacrylamide, polyvinyl alcohol, copolymer of polyacrylate, polyacrylamide, polyvinyl alcohol, copolymer of polyacrylate and polyacrylamide, copolymer of polyacrylate and polyvinyl alcohol, copolymer of polyacrylamide and polyvinyl alcohol, and combinations thereof. Such SAPs 40 are available from a number of manufacturers including Sumitomo Seika of Japan.

The SAP 40 is disposed on a surface of at least one of the first layer of nonwoven material 20 and the second layer of nonwoven material 30. As illustrated in FIGS. 1a–1b, in one embodiment, the SAP 40 can include a powder form and can be dusted on the first layer 20. The SAP 40 is disposed on the first layer 20 at a desired loading weight, which in part can depend on an application or a cable design in which the tape 10 is used. In one embodiment, the SAP 40 can be disposed at a loading weight in a range of, although not limited to, from about 10 grams per square meter (gsm) to about 50 gsm, and preferably about 20 gsm. A greater loading weight of the SAP 40 can generally provide greater water absorption capacity of the tape 10. In one embodiment, the SAP 40 can include a percentage of a total weight of the tape 10 of from about 25% by weight of solids (% wt) to about 50% wt.

The type of SAP 40 and its loading weight (gsm) relate, in part, to a desired swelling ratio of the tape 10. The swelling ratio as used herein refers to the extent or percentage by which the SAP 40 increases in volume upon contact with water. A certain swelling ratio of the SAP 40 may be required to achieve a desired swell height or thickness of the tape 10. In addition, a certain swell rate may be required to increase the height of the tape 10 within a desired time upon contact with water.

For instance, in one embodiment, the tape 10 can be formed for use with a fiber optic communications cable and can include at least one SAP 40 in powder form, e.g., Sumitomo JP 550F provided by Sumitomo Seiki of Japan. The SAP 40 is loaded between the first and the second layers of nonwoven material 20 and 30 at a loading weight of about 20 gsm. The SAP 40 includes about 30% wt of the total weight of the tape. The SAP has a powder particle size of about 75 µm. Upon contact with water, the SAP 40 swells to about 95% of its maximum volume within about thirty (30) seconds, and increases height of the tape 10 to about 6 to 8 mm. The loading weight of the SAP 40 helps to provide the tape 10 with rapid water absorption and to achieve a swelling ratio that provides a swell height sufficient to permit the tape 10 to form a physical water barrier. The lack of adhesives and bonding agents used to form the tape 10 can help to increase/maximize the swelling action of the SAP 40.

Figure 2C:
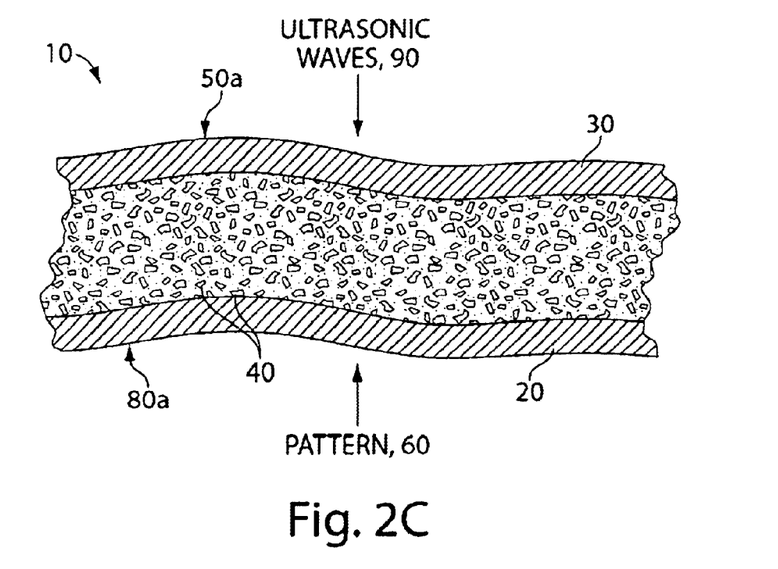
FIG. 2c is a cross-sectional view of the tape shown in FIGS. 2a–2b.

Referring to FIG. 2c, and with further reference to FIGS. 2a–2b, in one embodiment, the first layer of nonwoven material 20 is bonded to the second layer of the nonwoven material 30 in a pattern that is imprinted on the layers 20 and 30 using an ultrasonic bonding technique well known in the art. The technique can bond or fuse the first layer 20 and the second layer 30 by impinging a surface of at least one of the first layer 20 and the second layer 30 with ultrasonic waves. As shown in FIG. 2c, in one embodiment, once the SAP 40 is disposed between the first and the second layers 20 and 30, ultrasonic waves 90 impinge a first surface 50a of the second layer 30, and a pattern 60 imprints a first surface 80a of the first layer 20 at about substantially the same time as the first surface 50a receives the ultrasonic waves 90. The first layer 20 and the second layer 30 are essentially treated substantially simultaneously to bond or fuse the layers 20 and 30 along the lines or marks of the pattern 60. In one embodiment, the pattern 60 can imprint through the first and the second layer 20 and 30. In another embodiment, an area of the first surface 50a of the second layer 30 receiving ultrasonic waves is opposite to and substantially aligned with an area of the first surface 80a of the first layer 20 being imprinted with the pattern 60. As shown in FIG. 2b, in one embodiment, the pattern 60 can traverse the width W3 of the first and the second layers 20 and 30.

In one embodiment, the pattern 60 can include a repeating and substantially uniform pattern. In another embodiment, the pattern 60 can include an array of similar or dissimilar shapes. In a further embodiment, the pattern 60 may include an irregular or non-repeating pattern. As shown in FIGS. 2a–2b, in one embodiment, the pattern 60 can include an array of similar diamond shapes arranged in a repeating and substantially uniform pattern across the width W3 of the first and second layers 20 and 30. In one embodiment, each diamond shape can measure about 1.6 cm by 1.6 cm. Embodiments of the tape 10 according to the invention are not limited to any particular type of the pattern 60. The invention anticipates the pattern 60 can include various shapes and sizes of shapes, as can be required by a certain application in which the tape 10 is used and/or to accommodate a desired loading weight of the SAP 40.

One feature and advantage of the tape 10 includes a compartmentalizing effect of the bonding pattern 60. Portions of the SAP 40 are contained within shapes or configurations of the pattern 60 to thereby restrict movement of the SAP 40 between the layers 20 and 30. The pattern 60 helps to prevent concentration of the SAP 40 at points along the tape 10 and, in particular, helps to prevent pooling of the SAP 40 along the edges 20a, 30a and 20b, 30b of the first and the second layers 20 and 30. In addition, the pattern 60 helps to facilitate and maintain a distribution of the SAP 40 between the layers 20 and 30 that is substantially consistent, e.g., each shape or configuration of the pattern 60 contains approximately similar amounts of the SAP 40. The substantially consistent distribution of the SAP 40 helps to produce a swell height or thickness of the tape 10 that is substantially consistent, e.g., having little or no irregularities or inconsistencies that would affect water blocking performance of the tape 10, when the SAP 40 absorbs water and swells. The substantially consistent swell height of the tape 10 helps to create a reliable and consistent barrier to help to prevent or to at least reduce the extent of water penetration into a cable core and water migration along a cable span.

In addition, the pattern 60 is one factor that can help to increase/maximize a swell rate of the SAP 40 and a swell height of the tape 10. For example, if the pattern 60 is too tight, the volume of individual shapes or configurations of the pattern 60 will not accommodate a swelling action of the SAP 40 and will not permit the SAP 40 to swell freely nor at a swell rate sufficient to achieve a desired swell ratio upon contact with water. In contrast, if the pattern 60 is too loose, e.g., individual shapes or configurations are too large, the SAP 40 will not be compartmentalized and movement of the SAP 40 between the layers 20 and 30 will cause pooling of the SAP 40 along the tape 10. In this instance, a swell height can be inconsistent and the tape 10 may not form a substantially consistent and effective water barrier.

The bonding pattern 60 further provides a benefit of preventing or at least substantially reducing "fall-out" or loss of the SAP 40 from the tape 10 during cable manufacturing and stranding processes where the tape 30 is incorporated with one or more components of a cable or its core. Reducing fall-out of the SAP 40 helps to retain a loading weight of the SAP 40 for sufficient water absorption and consistent swell height.

Figure 3:
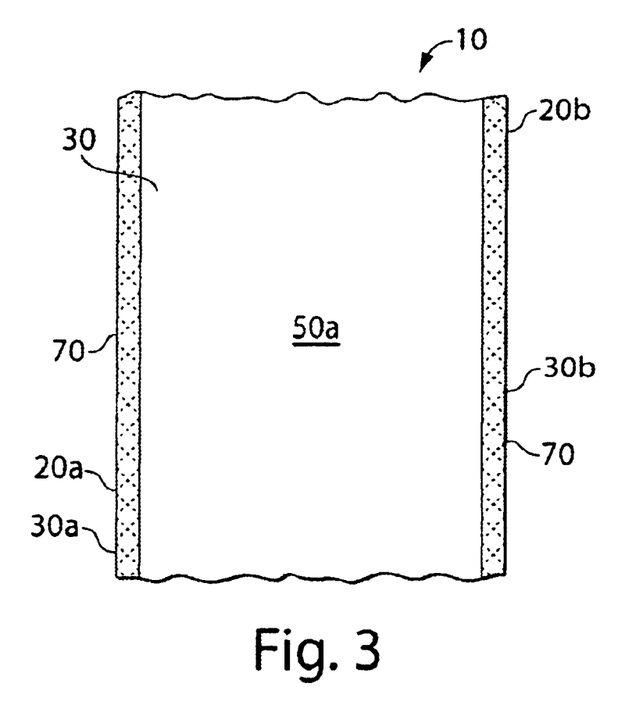

Referring to FIG. 3, in one embodiment, the tape 10 according to the invention 20 includes the first layer of nonwoven material 20 having substantially the same dimensions, e.g., width, as the second layer of nonwoven material 30 (not shown) such that longitudinal edges 20a and 20b of the first layer 20 are substantially even with longitudinal edges 30a and 30b of the second layer 30. The layers 20 and 30 are bonded by the ultrasonic bonding technique described above. Ultrasonic waves impinge the first surface 50a of the second layer 30. A strip 70 is imprinted on the first surface 80a of the first layer 20 along the longitudinal edges 20a, 20b, and 30a, 30b of the layers 20 and 30. The ultrasonic waves impinge the first surface 50a of the second layer 30 at substantially the same time as the strip is imprinted on the first surface 80a of the first layer 20. The layers 20 and 30 are thereby bonded or fused along the imprinted strips 70.

Figure 4A:
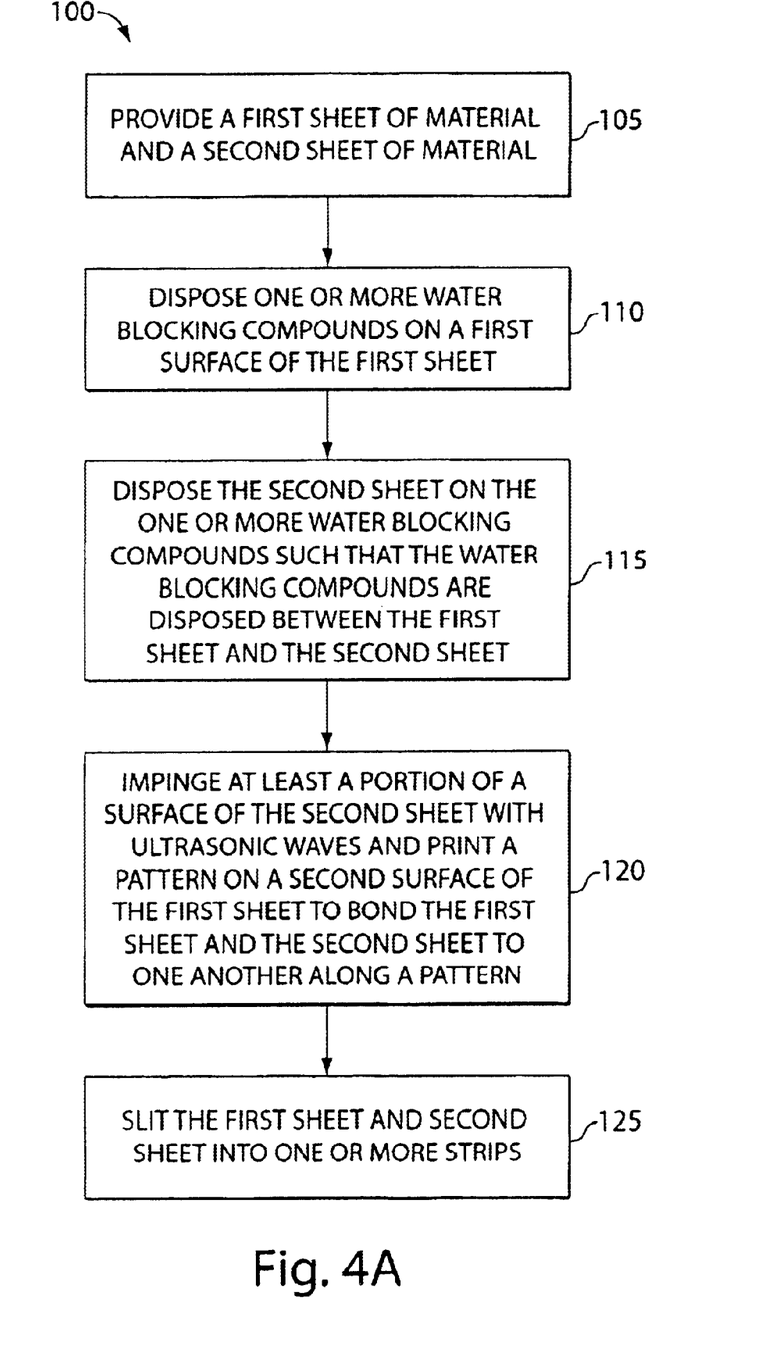
FIGS. 4a–4b are flow diagrams of methods of making the tape shown in FIGS. 2a–2c and FIG. 3.

Referring to FIG. 4a, the invention provides a method 100 of forming the water blocking tape 10 and includes the stages shown. The method 100, however, is exemplary only and not limiting and can be altered, e.g., by having stages added, removed or rearranged.

At stage 105, the first and the second layers 20 and 30 are provided, e.g., each layer 20 and 30 including a sheet of nonwoven material. Each layer 20 and 30 has desired dimensions, e.g., width, such that a desired number of the water blocking tapes 10 according to the invention can be formed from the first and the second layers 20 and 30 having desired dimensions.

At stage 110, at least one type of the SAP 40, e.g., in powder form, is applied, e.g., dusted, on one surface of one of the first layer 20 and the second layer 30 at a loading weight sufficient to achieve a desired swell rate and/or a desired swell ratio required for a particular application or a cable design in which one or more of the tapes 10 according to the invention will be used.

At stage 115, the second layer 30 is disposed on the first layer 20 such that the SAP 40 is disposed between the layers 20 and 30.

At stage 120, ultrasonic waves, e.g., provided by an ultrasonic horn, impinge the first surface 50a of the second layer 30 and the pattern 60, e.g., provided by a roller having a surface defining the pattern 60, imprints the first surface 80a of the first layer 20 substantially simultaneously as the ultrasonic waves impinge the first surface 50a. The layers 20 and 30 are bonded therethrough to fuse the first layer 20 with the second layer 30 along the imprinted lines of the pattern 60. In one embodiment, an area of the second layer 30 impinged by the ultrasonic waves is substantially opposite to and aligned with an area of the first layer 20 imprinted by the pattern.

At stage 125, the bonded layers 20 and 30 are slit into one or more tapes 10 according to the invention using one or more conventional cutting devices wherein each tape 10 has a desired width.

Figure 4B:
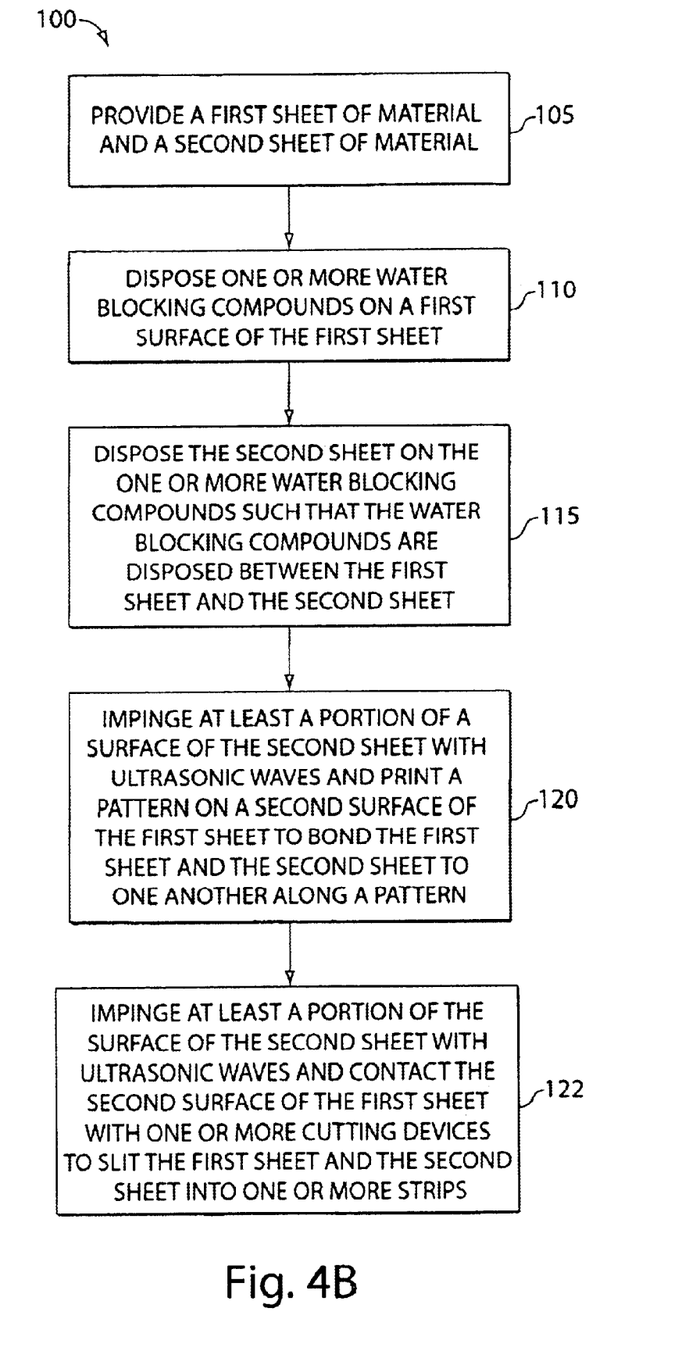

Referring to FIG. 4b, in one embodiment, the method 100 can further include stage 122 as an alternative to stage 125, as described above with reference to FIG. 4a. At stage 122, the bonded layers 20 and 30 can be conveyed past an ultrasonic cutting device, including an ultrasonic horn and one or more cutting devices to slit the layers 20 and 30 into one or more strips or tapes 10 according to the invention. As the layers 20 and 30 are conveyed past the ultrasonic cutting device, the ultrasonic waves produced by the ultrasonic horn impinge a surface of one of the layers 20 and 30 and one or more of the cutting devices contacts an opposite surface of one of the layers 20 and 30. The layers 20 and 30 are slit into multiple strips or tapes 10 when the ultrasonic waves impinge the surface and one or more of the cutting devices contact the opposite surface. In one embodiment, the ultrasonic waves impinge the surface substantially simultaneously or at the same time as the one or more cutting devices contacts the opposite surface. In one embodiment, an area of the surface of one of the layers 20 and 30 impinged by the ultrasonic waves is substantially opposite to and aligned with an area of the opposite surface of one of the layers 20 and 30. In one embodiment, the one or more cutting devices may be equally spaced apart to slit the layers 20 and 30 into one or more tapes 30 having substantially equal width. In another embodiment, the layers 20 and 30 have substantially similar dimensions, e.g., width, and longitudinal edges of the first layer 20 are substantially even with longitudinal edges of the second layer 30.

Figure 5:
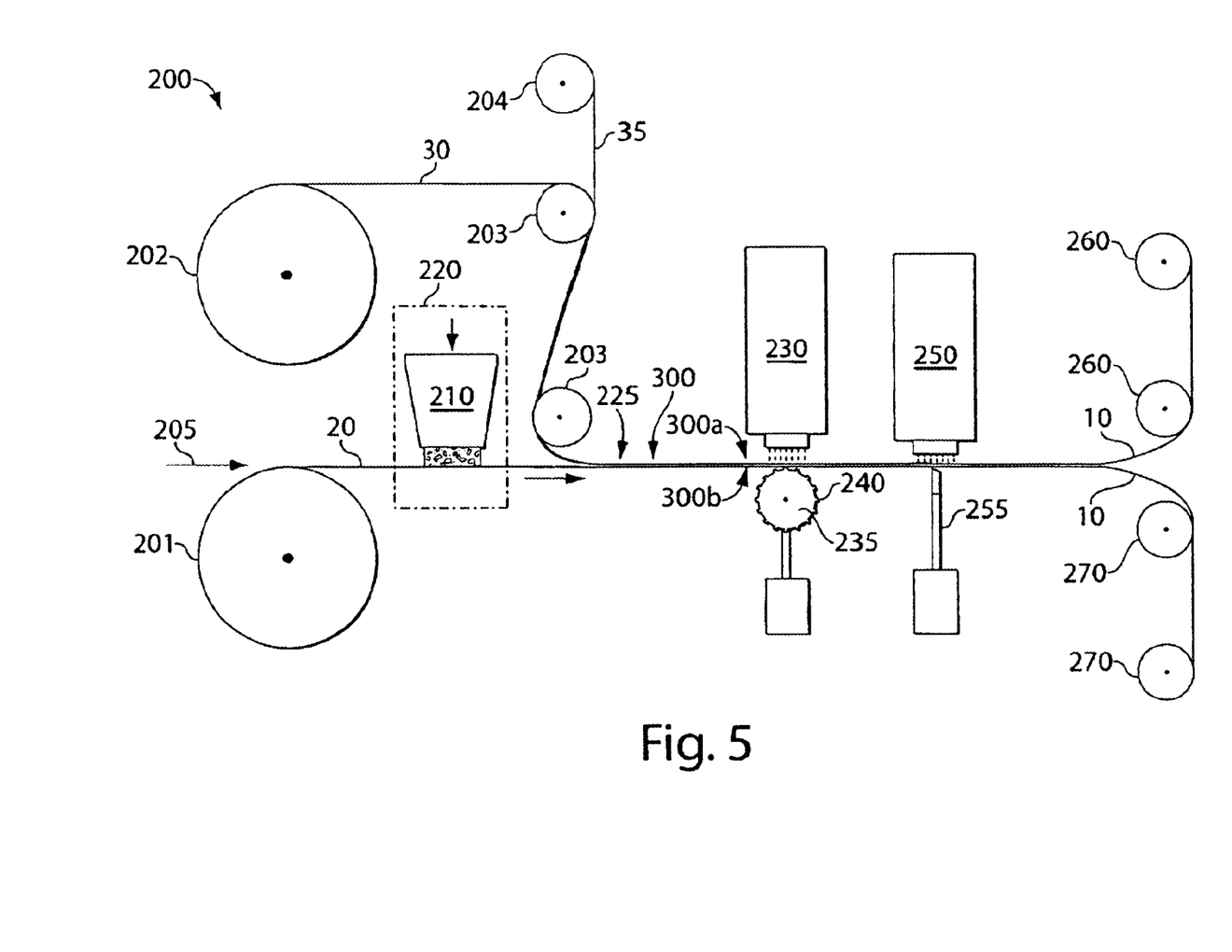
FIG. 5 is a cross-sectional flow diagram of a system and method of making the tape shown in FIGS. 1a–1b, FIGS. 2a–2c and FIG. 3.

Referring to FIG. 5, in another aspect, the invention provides a system 200 and a method for forming the water blocking tape 10 in a continuous in-line process using ultrasonic bonding and ultrasonic cutting techniques to form the tape 10 according to the invention. As shown in FIG. 5, at least a first feed roller 201, on which a nonwoven material having a desired width is wound, supplies the first layer of nonwoven material 20 to a production line 205. At least a second feed roller 202, on which a nonwoven material having a desired width is wound, supplies the second layer of nonwoven material 30 to the production line 205.

In one embodiment, the second feed roller 202 can be associated with a set of one or more idler rollers 203 that help to convey the second layer 30 from the roller 202 to the line 205. The idler rollers 203 can be placed proximate to the roller 202 to receive the second layer 30. The second feed roller 202 is associated with a set of one or more take-up rollers 260 and 270 disposed downstream from the feed roller 202 to help to convey the second layer 30 through the line 205, e.g., in a substantially horizontal orientation and with a sufficient tautness. As shown in FIG. 5, the first feed roller 201 is associated with the set of one or more take-up rollers 260 and 270 disposed downstream from the roller 201 to help to convey the first layer 20 through the line 205, e.g., in a substantially horizontal orientation and with a sufficient tautness.

In one embodiment, the second feed roller 202 can be further associated with one or more ancillary rollers 204 disposed to help to supply the layer of shielding material 35 to the line 205. As shown in FIG. 5, the ancillary roller 204 is disposed and configured such that it can feed the layer of shielding material 35 to one of the idler rollers 203. The idler roller 203 can then feed the second layer 30 and the layer of shielding material 35 to the production line 205.

The system 200 and method according to the invention is not limited to the arrangement and association of the feed rollers 201 and 202, the idler rollers 203, the ancillary roller 204 and the take-up rollers 206 and 207 as shown in FIG. 5, and anticipates different arrangements and associations of rollers to supply the first and the second layers 30 and 20 into the production line 205 and to convey the first and the second layers 30 through the product line 205, as well as to feed and convey the layer of shielding material 35 into and through the production line 205.

The system 200 further includes a dispenser 210 to dispense the SAP 40. In one embodiment, the dispenser 210 is disposed downstream from the first feed roller 201, e.g., above the production line 205, such that when the first layer 20 is conveyed along the line 205, e.g., in a substantially horizontal orientation, the dispenser 210 dispenses the SAP 40 to a surface of the first layer 20. In one embodiment, the dispenser 210 can include any device well known in the art for dispensing such material, e.g., a powder form of the SAP 40, and can be configured to confine the SAP 40 during dusting. In one embodiment, the dispenser 210 can include a housing 220 (shown in phantom) in which a negative pressure vacuum is created to contain and to localize the SAP 40 during dispensing. The housing 220 can include a pressure sensor and/or an indicator to detect and to display an internal pressure within the housing 220.

As the first layer 20 is conveyed past the dispenser 210, the dispenser 210 dusts the first surface 80a of the first layer 20 with the SAP 40 at a desired loading weight, e.g., from about 10 gsm to about 50 gsm and preferably about 20 gsm. In one embodiment, the first layer 20 can be ionized by an appropriate method known in the art, before or during dispensing of the SAP 40 on the first surface 80a.

The second feed roller 202 and/or one or more of the idler rollers 203 help to feed the 20 second layer 30 into the line 205, e.g., at a site 225 in the production line 205 where the second layer 30 is conveyed downstream from the dispenser 210. In one embodiment, the ancillary roller 204 feeds the layer of shielding material 35 into one of the idler rollers 203, and the idler roller 203 feeds the second layer 30 and the layer of shielding material 35 into the production line 205. The second layer 30 is conveyed along the line 205, e.g., in a substantially horizontal orientation, opposite and parallel to the first layer 20. During conveyance, the second layer 30 eventually becomes disposed on the first surface 80a of the first layer 20. In one embodiment, where the idler 203 also feeds the layer of shielding material 35 into the production line 205, the layer of shielding material 35 and the second layer 30 are substantially opposite and parallel to one another, and are substantially opposite and parallel to the first layer 20. During conveyance, the layer of shielding material 35 and the second layer 30 eventually become disposed on the first surface 80a of the first layer 20.

In one embodiment, each of the layers 20 and 30 has a substantially similar width to the other layer 20 and 30 such that when the second layer 30 is disposed on the first surface 80a of the first layer 20 as the layers 20 and 30 are conveyed in the production line 205, longitudinal edges of the first and second layers 20 and 30 are substantially aligned or even. In one embodiment, the layer of shielding material 35 has a similar width to one or both of the layers 20 and 30 such that when the layer of shielding material 35 is disposed on the second layer 30 as the layers 20 and 30 are conveyed in the production line 205, longitudinal edges of the layer of shielding material 35 and the first and/or the second layer 30 are substantially aligned or even. The first and second layers 20 and 30 and, optionally, the layer of shielding material 35, thereby form a continuous web 300 that is conveyed through the system 200 in the line 205.

The system 200 farther includes an ultrasonic lamination device including an ultrasonic horn 230 and an anvil roller 235. The ultrasonic horn 230 and the anvil roller 235 are disposed downstream from the dispenser 210. The ultrasonic horn 230 and the roller 235 are spaced from the production line 205 and disposed on opposite sides of the production line 205 such that the web 300 is conveyed in the production line 205 between the ultrasonic horn 230 and the roller 235. In one embodiment, the ultrasonic horn 230 and the roller 235 are disposed on opposite sides of the production line 205 and are in alignment such that the web 300 is conveyed by the ultrasonic horn 230 and by the roller 235 at about substantially the same time. In one embodiment, the ultrasonic horn 230 is disposed above the production line 205 and vertically aligned with the roller 235 disposed below the line 205. In this embodiment, when the web 300 is conveyed between the ultrasonic horn 230 and the anvil roller 235, the web is conveyed in a substantially horizontal orientation.

The invention is not limited to the arrangement and association of the ultrasonic horn 230 and the roller 235 as shown in FIG. 5 and anticipates other arrangements and associations between the ultrasonic horn 230 and the roller 235.

A surface of the roller 235 defines a pattern 240. The roller 235 imprints the pattern 240 on a second surface 80b of the first layer 20 when the roller 235 contacts the first layer 20 as it is conveyed through the line 205. In different embodiments, the pattern 240 can include any pattern that is desired to contain and/or to compartmentalize the SAP 40 between the first and the second layers 20 and 30. In one embodiment, the pattern 240 includes a repeating and substantially uniform pattern. In another embodiment, the pattern 240 includes an array of similar or dissimilar shapes. In a further embodiment, the pattern 240 includes an array of substantially similar diamond shapes and each diamond shape about 1.6 cm by 1.6 cm. In still another embodiment, the pattern 240 includes a non-repeating or irregular pattern. The roller 235 can include, for instance, a cylindrical shaped roller having a circular cross-section constructed of a material suitable for imprinting, such as, although not limited to metal, e.g., steel or chrome-plated steel.

The ultrasonic horn 230 can include any device well known in the art for producing ultrasonic waves. In one embodiment, the ultrasonic horn 230 is a device commercially available under the name and model number of Ultra Sonic Generator, 2 DPC Level 2 1200w, available from Dukane, St. Charles, Ill.

As shown in FIG. 5, the web 300 is conveyed in the production line 205 between the ultrasonic horn 230 and 30 the roller 235. The ultrasonic horn 230 emits ultrasonic waves such that as the web 300 is conveyed by the horn 230, ultrasonic waves impinge a first surface 300a of the web 300 that faces the horn 230. As the web 300 is conveyed in the production line 205 and by the roller 235, the roller 235 contacts a second surface 300b of the web 300 opposite to the first surface 300b that faces the roller 235. Contact of the roller 235 to the second surface 300b of the web 300 thereby imprints the pattern 240 across the second surface 300b of the web 300.

In one embodiment, as the web 300 is conveyed between the ultrasonic horn 230 and the roller 235, ultrasonic waves impinge a first area of the first surface 300a of the web 300 that is substantially opposite to a second area of the second surface 300b that the roller 235 contacts and imprints the pattern 240 thereon. The ultrasonic waves impinge the first area of the first surface 300a at substantially the same time as the roller 235 contacts and imprints the pattern 240 on the second surface 300b. The first and the second layers 20 and 30 are thereby bonded along the pattern 240 as a result of ultrasonic waves impinging the first area of the first surface 300a at substantially the same time as the printer 235 imprints the pattern 240 on the second area of the second surface 300b. The roller imprints the pattern 240 on the second surface 300b through the second layer 30 and through the first layer 20 when ultrasonic waves impinge the first surface 300a to bond the layers 20 and 30 along the pattern 240.

In one embodiment, the layers 20 and 30 are bonded along the pattern 240 substantially across the first area and the second area of the first and second surfaces 300a and 300b of the web 300. In one embodiment, the web 300 is conveyed continuously in the line 205 such that the ultrasonic waves continuously impinge the first surface 300a of the web 300 and the roller 235 continuously imprints the pattern 240 on the second surface 300b of the web 300 such that the first and the second layers 20 and 30 are continuously ultrasonically bonded along the pattern 240.

The system 200 further includes an ultrasonic cutting device including an ultrasonic horn 250 and one or more cutting devices 255, e.g., cutting anvils. The ultrasonic horn 250 and the cutting anvils 255 are disposed downstream from the ultrasonic lamination device 230 and 235. The ultrasonic horn 250 and the cutting anvils 255 are spaced from the production line 205 and disposed on opposite sides of the production line 205 such that the web 300 is conveyed in the production line 205 between the ultrasonic horn 250 and the cutting anvils 255. In one embodiment, the ultrasonic horn 250 and the cutting anvils 255 are disposed on opposite sides of the production line 205 and are in alignment such that the web 300 is conveyed by the ultrasonic horn 250 and by the cutting anvils 255 at about substantially the same time. In one embodiment, the ultrasonic horn 250 is disposed above the production line 205 and vertically aligned with one or more of the cutting anvils 255 disposed below the line 205. In this embodiment, when the web 300 is conveyed between the ultrasonic horn 250 and the cutting anvils 255, the web is conveyed in a substantially horizontal orientation The invention is not limited to the arrangement and association of the ultrasonic horn 250 and the cutting anvils 255, as shown in FIG. 5 and anticipates other arrangements and associations between the ultrasonic horn 250 and the cutting anvils 255.

The ultrasonic horn 250 can include any device well known in the art for producing ultrasonic waves. In one embodiment, the ultrasonic horn 250 is a device commercially available under the name and model number of Ultra Sonic Generator, 2 DPC Level 2 1200w, available from Dukane, St. Charles, Ill.

As shown in FIG. 5, the web 300 is conveyed in the production line 205 between the ultrasonic horn 250 and the cutting anvils 255. As the web 300 is conveyed between the ultrasonic horn 250 and the cutting anvils 255, the ultrasonic horn 250 emits ultrasonic waves such that as the web 300 is conveyed by the horn 250, ultrasonic waves impinge the first surface 300a of the web 300 that faces the horn 250. As the web 300 is conveyed in the production line 205 and by the cutting anvils 255, one or more of the cutting anvils 255 contacts the second surface 300b of the web 300 opposite to the first surface 300b that faces one or more of the cutting anvils 255. Contact of one or more of the cutting anvils 255 to the second surface 300b of the web 300 thereby slits or cuts the web 300 therethrough.

In one embodiment, as the web 300 is conveyed between the ultrasonic horn 250 and the cutting anvils 255, ultrasonic waves impinge the first area of the first surface 300a of the web 300 that is substantially opposite to the second area of the second surface 300b that one or more of the cutting anvils 255 contacts. The ultrasonic waves impinge the first area of the first surface 300a at substantially the same time as one or more of the cutting anvils 255 contacts and slit or cuts the second surface 300b through the second layer 30 and then through the first layer 20. The web 300 is thereby slit into two or more strips as a result of ultrasonic waves impinging the first area of the first surface 300a at substantially the same time as one or more of the cutting anvils 255 slits the second area and the web 300 therethrough. The number of strips into which the web 300 is slit depends on a number of the cutting anvils 255. In one embodiment, the web 300 is conveyed continuously in the line 205 such that the ultrasonic device 250 emits ultrasonic waves that continuously impinge the first surface 300a of the web 300 and the cutting anvils 255 continuously slit or cut the web 300 therethrough such that two or more strips are produced continuously.

As can be appreciated by those skilled in the art, the widths of the first layer 20 and the second layer 30 and the number and position of the cutting anvils 255 can determine the number and width of the strips or tapes 10 slit from the web 300 in a single production run as the web 300 is continuously conveyed through the system 200. In one embodiment, the cutting anvils 255 can be arranged to slit strips or tapes 10 having different widths to thereby produce a number of tapes 10 for more than one application or cable design.

As shown in FIG. 5, the system 200 includes the take-up rollers 260 and 270 disposed downstream from the ultrasonic cutting device 250 and 255 to remove the strips or tapes 10 from the line 205 and to wind the tapes 10 thereto.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of forming a water blocking tape, the method comprising:

providing a first sheet of material;

dispensing one or more water blocking compounds on a surface of the first sheet of material;

disposing a second sheet of material on the surface of the first sheet of material such that the one or more water blocking compounds are disposed between the first sheet and the second sheet to form a web;

impinging at least a portion of a first surface of the web with ultrasonic waves; and printing a pattern on at least a portion of a second surface of the web, wherein the first sheet and the second sheet of material are bonded therethrough along the pattern.

2. The method of claim 1 wherein impinging at least a portion of the first surface of the web with ultrasonic waves includes impinging at least a portion of the first surface of the web with ultrasonic waves at substantially a same time as printing the pattern on at least a portion of the second opposite surface of the web.

3. The method of claim 1 wherein the portion of the first surface of the web impinged by ultrasonic waves is opposite to the portion of the second surface of the web printed with the pattern.

4. The method of claim 1 wherein the pattern traverses at least a portion of a width of the web.

5. The method of claim 1 wherein the pattern includes a repeating and substantially uniform pattern.

6. The method of claim 1 wherein portions of the one or more water blocking compounds are compartmentalized by the pattern such that the one or more water block compounds are disposed substantially consistently between the first sheet of material and the second sheet of material.

7. The method of claim 1 further comprising:

impinging the first surface of the ultrasonically bonded web with ultrasonic waves and contacting the second surface of the web with one or more cutting devices such that the cutting devices slit the web therethrough into one or more strips.

8. The method of claim 7 wherein impinging the first surface of the ultrasonically bonded web with ultrasonic waves includes impinging the first surface of the ultrasonically bonded web at substantially a same time as the one or more cutting devices contacts the second surface of the web.

9. The method of claim 7 wherein a portion of the first surface of the web impinged by ultrasonic waves is opposite to an area of the second surface of the web contacted by the one or more cutting devices.

* * * * *